Sept. 1, 1942.    J. NEIMAN    2,294,511
METHOD FOR INDICATING THE WATER REPELLENT QUALITIES
OF MATERIALS UNDER VELOCITY CONDITIONS
Filed Dec. 6, 1940
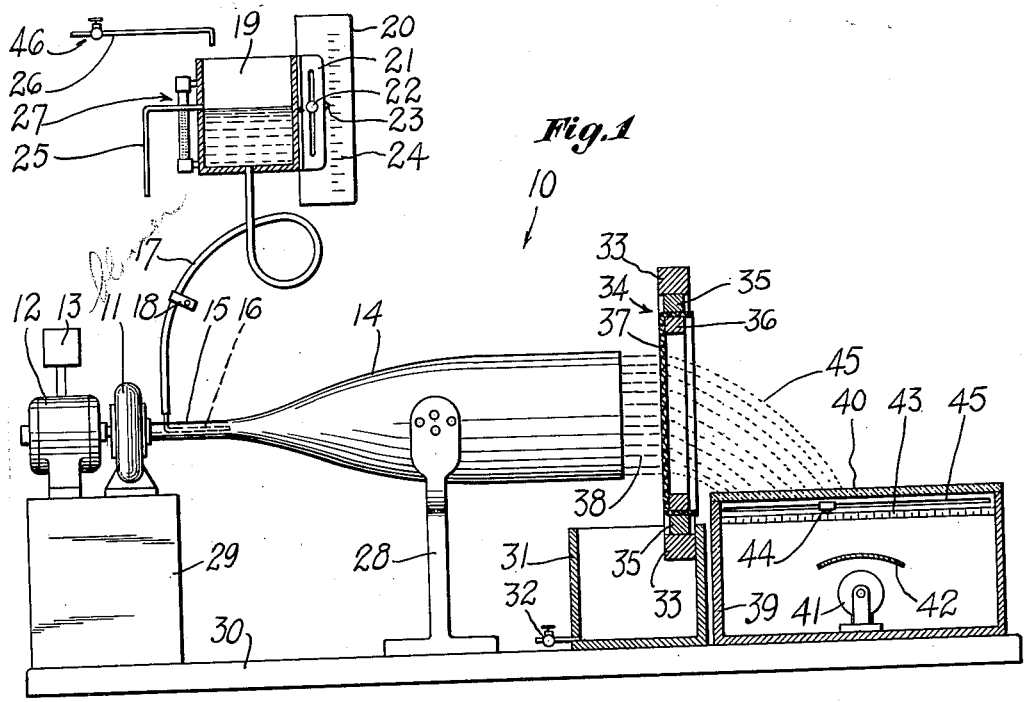
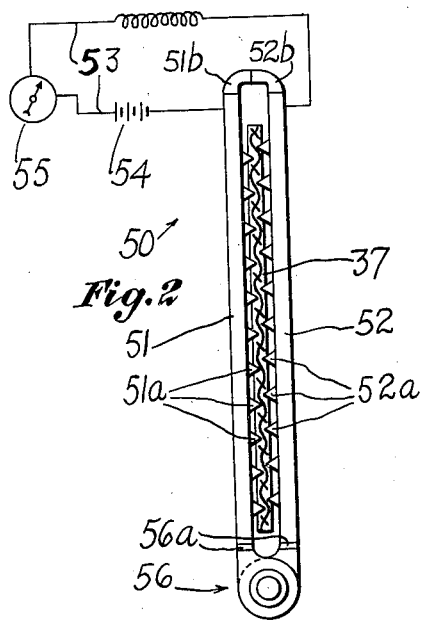
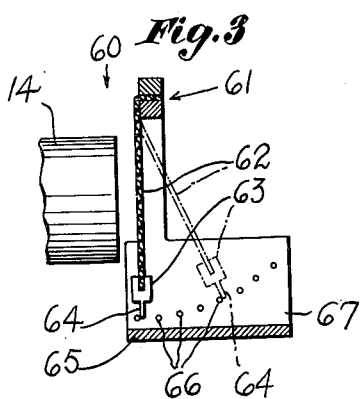
INVENTOR
Jerome Neiman
BY Louis Shumacher ATTORNEY.

Patented Sept. 1, 1942

2,294,511

UNITED STATES PATENT OFFICE 2,294,511

METHOD FOR INDICATING THE WATER REPELLENT QUALITIES OF MATERIALS UNDER VELOCITY CONDITIONS

Jerome Neiman, Woodcliff Lake, N. J.

Application December 6, 1940, Serial No. 368,760

4 Claims. (Cl. 73—51)

This invention relates to methods for testing the water repellent or waterproof qualities of materials under velocity conditions, as in the case of wind and rain, and with particular reference to thin, sheet-like members or coatings, including textile fabrics, painted surfaces, and the like.

One object of the invention is to provide improved methods for testing the water and/or wind repellent quality of porous or permeable materials.

Another object of the invention is the provision of improved methods for testing the relative wetting qualities of different materials, especially when simultaneously subjected to wind and moisture.

Another object of the invention is to provide methods for testing the resistance of a material against penetration by a liquid, especially when the latter impinges on the material under a substantial velocity.

Other objects and advantages of the invention will become apparent as the specification proceeds.

With the aforesaid objects in view, the invention is indicated in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a diagrammatic view in elevation with parts removed or in section showing an apparatus embodying the invention, and adapted for the practice of one phase of my new methods.

Fig. 2 is a similar view of a modification, adapted for the practice of another phase of my new methods.

Fig. 3 is a similar view of another modification adapted for the practice of still another phase of my new methods.

Generally described, the problem of the invention relates to providing a standard or standards whereby the water and/or wind repellent qualities of materials may be gaged. The standard utilized may be arbitrary, providing only that the comparative results are correct. The need for a solution of the problem is, perhaps, best exemplified by the so-called water repellent textile fabrics. These generally consist of cotton textiles which have been chemically impregnated, and are not waterproof in the strict sense of the word, but nevertheless have a diminished tendency to wetting. Such fabrics are being used on an ever increasing scale, but the development of the industry is seriously handicapped by the lack of a method or apparatus for comparison. Thus one water repellent fabric may be highly efficient and almost waterproof, whereas another may wet quite readily. Yet in the sale of the merchandise both are called water repellent, and their comparative qualities cannot be described in a manner which would be accepted in the trade and which the trade would be capable of using for a check up of different fabrics. Similarly, the merchant cannot check up on different shipments to ascertain whether they are up to a given standard, or to what extent they fall below that standard so as to warrant rejection. A related problem occurs in the paint and other industries, where various materials are sold as water resistant or water repellent.

I perceived that in order to satisfactorily solve the problem, it was necessary to provide a relatively simple, inexpensive means for carrying out the tests. For example, the ordinary merchant could not be expected to use a delicate chemical balance to weigh the increment in weight due to the wetting of a material, and of course, the cost of such a balance would be excessive. It was necessary to provide a suitable means of a rather rugged type which would afford a direct indication of the water repellent quality.

I early perceived that in order to be really instructive the tests used would desirably include a stream of water and air both traveling at relatively high velocity in the form of a spray to simulate a wind and rain condition. For example, an average velocity of 35 miles per hour would be satisfactory, because the air or gas that might be employed tends to drive the water into the material that is being tested.

I discovered that the water repellent quality of a treated textile fabric has two aspects: first, the extent to which the exposed surface of the fabric becomes wet (although the rear surface may remain dry); and, second, the extent to which the water passes through the fabric as a spray. Oftentimes, a fabric may not wet at all and may nevertheless permit a quantity of water to pass therethrough as a very fine spray. I found that a test based on the latter is in general satisfactory and accurate for both of the above mentioned phases, especially as the water repellent quality is thus directly affected.

Nevertheless I have provided test methods and means based not only on the spray that passes through the fabric, but also on the areas actually wetted. And furthermore, I have provided a simplified device for indicating the degree to which a fabric may be wind repellent. The realization of all of the foregoing constitutes an important object of the invention and the defects perceived and the concepts involved are believed to form a part of the invention.

Referring in detail to the drawing, 10 denotes an apparatus embodying the invention. The same may include an air blower 11, driven by a motor 12 and adapted to supply air at variable pressures, as by controlling the speed of the motor by a suitable electrical device 13. Connected to the blower outlet is a conduit member 14 so designed as to translate a part of the velocity head into pressure head. Accordingly, the member 14 may constitute an injector of circular cross section, in the throat 15 of which is axially disposed an elongated nozzle or tube 16, which leads outward into connection with a pipe or hose 17 that may be controlled as by a pinch cock 18. The hose 17 may be connected to a reservoir or water container 19 which may be mounted on a wall member 20 by a slotted bracket and set screw 21, 22 respectively. The bracket, which is affixed to the container 19, may have a pointer portion 23 movable along a scale 24, whereby the head of water supplied to the nozzle 16 may be accurately determined. In order to maintain a constant head of water in the container 19, a drain pipe 25 may be provided, and an inlet pipe 26 may constantly discharge water into the container 19 in such volume that the water head is constantly at the elevation of the outlet 25. If desired, a water gage 27 may be mounted on the container for a check up on the head of water therein.

The injector 14 as well as the motor and blower unit may be mounted on their respective standards 28, 29, which are affixed to a common base 30, whose elevation may be stationary. Desirably the axis of the injector may be slightly downwardly inclined toward the outlet thereof as shown for the ready drainage of water that may collect on the side wall of the injector tube.

Also mounted on the base 30 is a container 31 which may have a drain 32. Affixed to this container is a frame member which may be of square or circular form. Removably fitted into this frame member is a frame structure 34 which may include a pair of frames 35, 36 one of which is adapted to fit inside of the other with only enough clearance to receive and clamp therebetween the marginal portion of a thin sheet-like member 37, which is thus maintained uniform or taut and in position to uniformly receive the spray 38 from the ejector 14, with the drippings running down into the container 31. If the frames 33 and 34 are circular, the latter may be rotated during the spray to assure a uniform test.

Adjacent to the container 31 is a casing 39 fixed to the base 30, and having its top wall formed by a sheet of suitable glass 40. Within the casing is any source of light 41, and a reflector 42 to assure uniform illumination of the glass 40 by reflection from the casing walls. Along one wall of the latter is provided a scale 43 to indicate the distance of travel of the fine spray 45 that has passed through the member 37. Of course the scale could be placed directly on the glass 40, but this might interfere with observation of the fine drops of liquid deposited on the glass. The measurement referred to may be aided by the use of a square, which is manipulated from the outside of the casing, with the shank 44 thereof being translucent or in the form of a wire and slidable in a slot 45 of the casing. Thus the square permits measurement on the scale 43 of any point along the glass.

The manner of using the apparatus 10 and of practising the method invention will now be described. The spray 38 is produced under predetermined constant conditions, with the head of water, the air velocity and the injector characteristics and its distance from the member 37 being according to test conditions. A desirable average velocity for the spray may illustratively be about 35 miles per hour. The test may be continued for a predetermined period of time which is preferably taken by stop watch but may be fixed by the quantity of water in the container 19, since the inlet 26 may be closed as by a valve 46, when the head of liquid is at the overflow 25. The member 37 may be a sheet of the water repellent material, such as a chemically treated textile, or it may consist of a sheet of closely woven textile, which has been coated or painted, if it be desired to test for the water repellent quality of a paint or other similar material. When the spray 38 strikes the member 37, most of it is deflected laterally into free atmosphere, but a part thereof passes through the member 37 in the form of a very fine spray 45 of reduced velocity. The indication of the energy of the spray 45 is now taken, preferably by measuring its distance of projection, as along the glass 40 and with the aid of any suitably calibrated scale 43. Desirably, the test should not continue so long that the fine particles of spray deposited on the glass run together to a substantial degree near the furthest end of its path, because that might obscure the results. By rotating the frame 34, the maximum projection through different parts of the member 37 may be noted.

Much better results have been obtained by substituting a sheet of absorbent or blotter paper in place of the glass 40. Such paper has an affinity for a spray which may be so fine as to be unobservable on the glass. The blotter paper darkens in color even when the moisture absorbed is so slight as to almost immediately evaporate.

In reference to this test it is of interest to note that water repellency of textile fabrics seem to be governed at least in part by the quality of the textile including the closeness of the weave and the quality or fineness of the yarn and the strands of which it is composed. In other words, given the same chemical treatment, the better fabric will produce a more highly water repellent material.

While the test above described may be used for a general or complete indication of the water repellent qualities, because the wetting characteristic varies in general as the projection of spray through the fabric, it may be desirable in certain cases to test for the wetting characteristics per se. In this regard, it is to be noted that a chemically treated water repellent textile does not wet uniformly, unless indeed, it becomes wholly wet, but rather it wets in spots, due apparently to the lack of uniformity of the water proofing constituent. Hence the measurement of the area of wetness has presented a problem.

At 50, Fig. 2, is shown an electrolytically acting apparatus. The same may comprise a plurality of plates or main electrodes 51, 52 connected into an electrical circuit 53 that may include a source of current 54 and a galvanometer 55. Each of the electrodes may have a series of point electrodes 51a and 52a respectively which cover an area equal to the exposed area of the member 37. Thus any part or parts of the member 37 that may be wetted are responsive to the point electrodes when the wetted member 37 has been removed from the apparatus 10 and clamped between the opposed point electrodes 51a and 52a. Actually each point electrode 51 is offset laterally from the adjacent point electrode 52a, so that when they penetrate into the member 37 they will not make direct contact with each other. Only through the intervening electrolyte, if any, can they cause the flow of electrical current, and hence the greater the wetted areas, the greater the current and the larger the galvanometer reading. To readily maintain a guided coaction with each other for the offset relation of the point electrodes, any suitable guides may be used such as the hinge means 56 suitably insulated at 56a and about which the plates 51, 52 are swingable toward each other to operatively engage therebetween the member 37. Moreover, a stop means such as insulated stops 51b and 52b may be provided to limit the movement of the point electrodes toward each other for accuracy in indication. The members 51, 52 may be constructed like wire brushes the bristles whereof may be rigid and pointed to penetrate the fabric since one side of the wetted fabric may be dry; and the bristles may be electrically interconnected by a plurality of sheets of metal foil through which the bristles extend; or by electrical deposition of a metal over such a sheet of metal foil or upon some other conductor.

In Fig. 3 is shown a modification illustrative of a method and apparatus 60 for indicating the wind resistance of a flexible fabric, such as a textile which has been treated to be water repellent. A clamp 61 may secure an edge portion of a fabric member 62 so as to suspend the same for swinging movement as to the position shown in dot-dash lines. At its lower end, a weight 63 may be attached to the member 62, and this weight may have a pointer or projecting portion 64. A U-shaped member 65 may have a series of thin strands 66 connected to the side walls 67 thereof, and these strands may be disposed along an arc that is centered on the axis of suspension of swingable member 62. When a stream of air, as from the conduit 14 that is relatively close to the member 62 impinges on the latter, the same may swing to the dot-dash line position with the projection 64 moving upward across the strands 66 and finally being retained at a strand where the member 62 is at rest. These strands may have suitable scale indicia, and observation by this device 60 is rendered simple.

I claim:

1. The method of comparative testing of the water repellent quality of porous, thin sheet-like materials, including disposing different sheet materials along like upright planes and so that the opposite faces thereof are relatively free and unobstructed, providing a liquid spray including a stream of air for relatively uniformly carrying the liquid particles of substantially constant volumes and at a substantially constant predetermined velocity such that the liquid spray simulates wind and rain weather conditions, projecting said liquid spray on like faces of the different sheet materials so that quantities of the liquid spray passes through the sheet materials according to the water repellent qualities thereof, and measuring and comparing the energy of these liquid particles that have passed through the different sheet-like materials to thus obtain an indication of their relative water repellent qualities.

2. The method of comparing the water repellent qualities of members consisting of different sheet-like porous materials through which wind or rain can pass, including projecting on the different members liquid sprays of like characteristics and under like conditions, and measuring and comparing the energies of those portions of the liquid sprays that succeed in passing through the different members as sprays.

3. The method for comparing the water repellent qualities of members consisting of different sheet-like porous materials through which wind or rain can pass, including projecting on the different members liquid sprays of like characteristics and under like conditions, while maintaining said members upright, and measuring and comparing the horizontal projection of those portions of the liquid sprays that pass with velocity through the different members.

4. The method of comparing the liquid-repellent qualities of different members through which wind and rain is projecting like sprays on said members, so that portions of the sprays pass through the members in spray form, and comparing the energies of the different spray portions.

JEROME NEIMAN.